UNITED STATES PATENT OFFICE 2,461,396

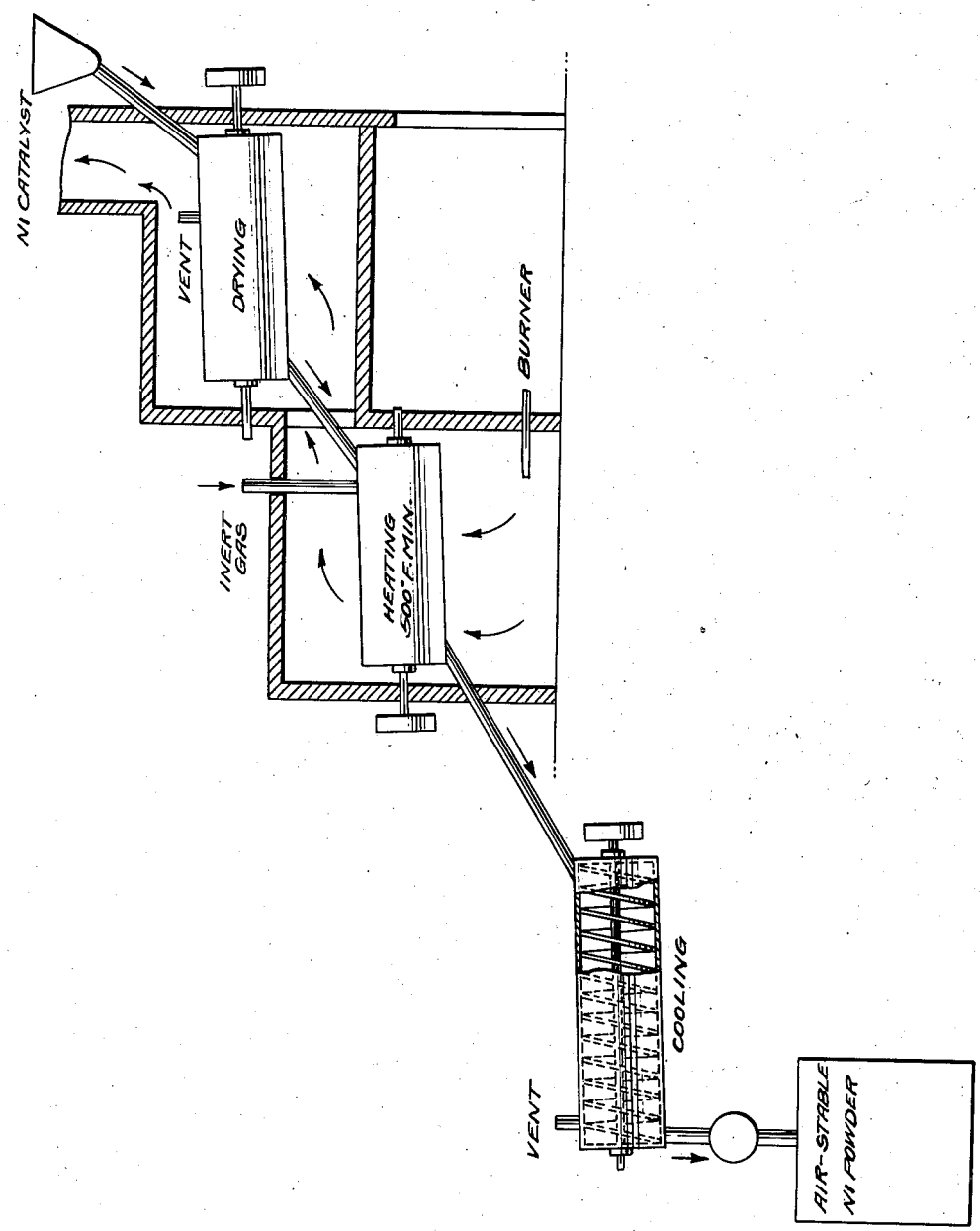

METHOD OF PRODUCING FINELY DIVIDED METALS

Murray Raney, Chattanooga, Tenn.

Application July 25, 1945, Serial No. 606,972

1 Claim. (Cl. 75—0.5)

This invention relates to the manufacture of finely divided, air-stable nickel and pertains to a method of preparing pure nickel in finely divided, highly reactive form capable of being agglomerated, molded, or the like, by powder-metallurgy techniques, but being stable in the air.

The process is applied to finely divided catalytically active nickel-hydride powder such as that produced by dissolving the alloying metal from a nickel alloy with a solvent which effects the dissolution with evolution of hydrogen. The process consists in heating the catalyst at about atmospheric pressure under a non-reactive atmosphere of carbon dioxide or hydrogen to a temperature of about 400° F. to initiate exothermal decomposition of the nickel hydride, maintaining the material below sintering temperature during the exothermal decomposition until evolution of hydrogen stops, and cooling the resulting non-sintering nickel powder in the presence of such non-reactive atmosphere, whereby a finely divided nickel powder is obtained which is stable in air but highly reactive and capable of being pressure-molded by powder metallurgy techniques.

In my Patents 1,563,587 and 1,628,190 there is described various methods of preparing pure nickel catalysts in finely divided form, the procedures there described involving the preparation of a nickel alloy from nickel and a more reactive metal, followed by pulverizing the alloy and dissolving the more reactive metal from the powdered alloy by means of a solvent, which is capable of dissolving the reactive metal with the evolution of hydrogen but without dissolving the nickel.

In practice, the metals employed for alloying with the nickel are usually aluminum, or silicon, or mixtures thereof, and the solvents are usually caustic alkalis. The nickel catalysts produced by these methods have found widespread use, for example, in the hydrogenation of oils, fats, waxes, and other unsaturated chemical compounds.

The nickel catalysts thus produced are believed to be in reality compounds of nickel and hydrogen, probably a mixture of the nickel hydrides NiH and NiH$_2$. Such catalysts have the characteristic property of spontaneously igniting when exposed to the air. To preserve these catalysts they must be kept in an inert atmosphere or under an inert liquid, such as water or oil. Moist samples when exposed to the air first start to heat and, after the water has been driven off, they heat sufficiently to produce a bright red glow. It has been found that the heating is due to the liberation of hydrogen from whatever compound, or compounds, of nickel and hydrogen may be present, the reaction involved being exothermic. The powder remaining after ignition has lost its catalytic properties and is not suitable for many purposes. If it does not actually combine with the oxygen and nitrogen and other gases in the air, it seems to absorb them and to produce a nickel of a form substantially different from and less reactive than the nickel powders produced in the present process.

I have found that if the catalytic powders, produced by the methods described, are heated in moist condition in a non-reactive or inert atmosphere to temperatures of at least about 400° F., an exothermic reaction takes place in which hydrogen is expelled from the catalyst leaving a pure, air-stable nickel powder which can be recovered by cooling under the same type of atmosphere. The exothermic reaction which takes place in my new process is similar in some respects to that which takes place upon exposure of the moist catalyst to the air, but with the important difference that the new nickel powder is substantially more reactive towards halogens, for example, and can be pressure molded by the usual methods employed in the art of powder metallurgy. My new nickel powder also retains some of its original catalytic power, which is not true of the powder recovered after the moist catalyst has been ignited in the presence of air.

It is possible to produce the new nickel powder by heating the described nickel catalysts in carbon dioxide or hydrogen at atmospheric pressure. Among the other gases which can be utilized, helium, neon and argon may be mentioned. Nitrogen cannot be used, since this gas is reactive to at least some extent in the heating step, and it has been found that, when nitrogen is used, the product obtained is quite similar in properties to the product resulting from the spontaneous ignition of the catalyst in air.

The heating step may be conducted in any type of furnace from which air can be excluded. It requires heating to a temperature of at least about 400° to 500° F. to start the exothermic reaction in which hydrogen is expelled. The heat generated by the reaction is usually sufficient to raise the temperature of the mass to about 1200° F. or over. Heating can be stopped as soon as the exothermic reaction commences, or it can be continued to speed up the reaction if desired. However, a slight agglomeration takes place at temperatures of about 1300° F. or slightly above, and it is therefore usually desirable not to exceed these temperatures. Temperatures at which any substantial sintering takes place should be avoided if a finely divided product is desired. In order to eliminate all agglomerating action, it is possible to supply cooling to the furnace as soon as the exothermic reaction begins, thus keeping the maximum temperature reached below about 1000° F.

The present process can be conducted either on the batch or the continuous basis. If on a batch basis it is necessary to charge the furnace, then heat it to reaction temperatures and finally to cool it before removing the batch while continuously passing an inert gas through the furnace. The continuous process is more efficient since the apparatus units can be maintained at the same temperature throughout.

In the accompanying drawing, there is shown one type of apparatus which may be employed in carrying out the continuous process.

The nickel catalyst, formed by dissolving from a nickel alloy all metals other than nickel in the manner described is introduced into the hopper at the right side of the drawing. It passes into the first drum furnace which is heated in any suitable manner, such as indirectly by furnace gases. The furnaces shown are stationary but are equipped with screw conveyors which serve to move the material continuously from the entrances to the exits. The first drum produces primarily a drying action on the nickel catalyst and the maximum temperature at the exit may run from about 300° to 450° F. In the second drum, the conversion of the nickel hydride, or hydrides, to pure nickel takes place, and in this drum the temperature must reach about 450° F. in order to start the exothermic reaction. It is desirable that this minimum temperature be reached near the entrance to the drum so that the reaction can be substantially completed before the nickel powder passes into the final cooling drum. The second drum is therefore advantageously heated by furnace gases in the first pass of the furnace, as shown. An inert gas, such as carbon dioxide or hydrogen, is passed into the second or high temperature drum, and this gas is vented from the other two drums as indicated. The final drum may be supplied with artificial cooling means if desired, but air cooling is usually sufficient, since the air-stable powder needs to be cooled only to temperatures of about 200° to 300° F. before being discharged into the final container. The powder is usually discharged through a star wheel or other device to prevent access of air to the cooling drum.

In one specific embodiment of the present invention, employing the batch method, a small cylindrical retort was employed having a diameter of eight inches and a depth of six inches made from ten gauge black steel plate. The retort was provided with a removable cover which had an inlet tube and an outlet tube, through which gases could be passed, as well as a central opening in which a pyrometer couple was inserted. This retort was heated at the bottom and sides with burners.

The retort was charged with a nickel catalyst in the form of a suspension of nickel in water containing 40 percent nickel with the rest water, weighing 2800 grams. This nickel was an active catalyst and had been prepared from a nickel-aluminum alloy by dissolving out the aluminum from the pulverized alloy by means of a solution of caustic soda. The cover was clamped into place after the thermocouple had been adjusted so that it would rest about in the center of the nickel mass with the cover in position. A flow of carbon dioxide into the retort was started through one of the tubes, this gas being discharged freely into the air from the other tube. Heat was then applied slowly until all the water was evaporated and then the rate of heating was increased. The following readings of temperatures were taken and notes made during the run:

| Time | Temperature | Remarks |
| --- | --- | --- |
| 10:00 a. m. | Room | $CO_2$ and low heat started. |
| 10:30 a. m. | 140° F. | |
| 11:00 a. m. | 200° F. | |
| 11:15 a. m. | 200° F. | Heat increased. |
| 11:30 a. m. | 300° F. | Full heat on. |
| 11:45 a. m. | 500° F. | |
| 11:50 a. m. | 700° F. | Flame at exhaust tube. |
| 11:55 a. m. | 1180° F. | Flame stopped. |
| 12:00 m. | 1200° F. | |
| 12:15 p. m. | 1220° F. | |
| 12:30 p. m. | 1200° F. | |
| 12:40 p. m. | 900° F. | |
| 1:00 p. m. | 600° F. | |
| 1:30 p. m. | 340° F. | |
| 2:00 p. m. | 220° F. | |
| 2:30 p. m. | 150° F. | |

An analysis of the above values shows that an exothermic reaction starts at about 400° to 500° F. and at 700° F. is proceeding vigorously, because in the five minute interval between 11:45 and 11:50 there was an increase of 200° in the temperature and a flame was burning at the exhaust tube. During the next five minute interval, the temperature had increased from 700° to 1180°, an increase of 480° without any any increase in the applied heat, which had remained constant since the temperature reading of 300°. At 1180° the flame stopped burning at the exhaust tube. The temperature increased only 40°, to 1220°, during the next twenty minute interval and then started to decrease, indicating that the reaction was complete. When the temperature had dropped to 1200°, the heat was cut off; and the charge was allowed to cool.

When the retort was emptied, it was found that the nickel mass had agglomerated, but had not sintered and it was easily broken up into its original fineness. The nickel, after this treatment, did not glow or show any indication of heating when exposed to air, thus indicating a complete change in the character of the nickel brought about by heating it in carbon dioxide gas through the critical point as indicated by the test data.

In a comparative test, a sample of the same nickel catalyst was heated in the same retort in an atmosphere of carbon dioxide at temperatures reaching a maximum of about 300° F. until it was thoroughly dry, followed by cooling in the presence of carbon dioxide. This sample, when exposed to the air, was found to ignite spontaneously, reaching a bright red heat, in contrast to the stable character of the product obtained in the preceding test. This shows that the peculiar properties of the product obtained by heating the nickel catalyst to critical temperatures of at least about 400° F. are due to the breaking down of nickel hydrides, probably $NiH_2$ or a mixture of this with $NiH$, and not due to the blanketing of the nickel by the inert gas or to the absorption of this gas by the nickel.

Oddly, the same results obtained with carbon dioxide are also obtained when hydrogen is employed as the non-reactive gas. During the formation of the nickel catalyst, hydrogen is evolved and this is in nascent or atomic condition, in which state it apparently has the power of uniting with the nickel to form the hydrides mentioned. When these hydrides are heated to the critical temperature of 400° F. or above, they decompose leaving free nickel, and it appears that this nickel is incapable of uniting with molecular hydrogen to again form the hydrides even when the nickel is cooled below 400° F. in the presence of hydrogen. This appears to be a logical explanation of the facts which have been stated.

It has been found that the new nickel powder of the present invention retains some of the catalytic power of the original nickel catalyst. In one test, the new powder was found to require a period of three hours to hydrogenate a given weight of cottonseed oil to the extent of 50 percent. In contrast, the nickel catalyst, used as a raw material in the production of the nickel powder, was capable of hydrogenating the same amount of cottonseed oil within one hour to the extent of 100 percent. For practical purposes, therefore, the new nickel powder would not be as efficient as other catalysts for use in most hydrogenation reactions. But its other properties, such as stability in air, its high chemical activity, and its ability to pressure mold, make it useful in other fields in which the original nickel catalyst has no utility.

The new product appears particularly useful in the production of molded parts of all types, such as gears, bushings, and the like. Such parts molded under the usual conditions of high temperature and pressure utilized in powder metallurgy, have been found to possess high tensile strengths and abrasion resistances. They can be made to extremely small tolerances.

While I have described what is considered to be the best embodiments of the present invention, it is evident that various modifications can be made in the specific procedures which have been described without departing from the purview of the present invention. Thus, while I have described a heating process in which an atmosphere of a non-reactive or inert gas is employed in the reaction zone at substantially atmospheric pressure, it is possible to employ pressures both above and below atmospheric pressure. Any type of furnace in which an atmosphere of an inert gas can be maintained, can be employed in the heating step of my process. The time required in the heating step is not critical, nor are the rates of heating and cooling. All of these factors can be varied widely. It is only necessary that the temperature reached in the heating step be sufficiently high to decompose the nickel hydride, or hydrides, which reaction is evinced by the evolution of hydrogen, and preferably insufficient to cause any substantial sintering of the finely divided nickel. In other words, my process can be conducted simply by heating an active nickel catalyst in a non-reactive atmosphere until the evolution of hydrogen takes place, continuing the heating until this evolution has stopped and cooling in said non-reactive atmosphere. As a raw material, any finely divided reactive nickel catalyst can be employed which has been produced from a finely divided nickel alloy by dissolving therefrom all metals other than the nickel with a solvent capable of dissolving said metals with the evolution of hydrogen. While I usually prefer to operate the heating step of my invention at temperatures below those at which sintering takes place, it is equally possible to raise the temperature until a slight sintering effect is produced. The resulting product, when cooled, can then be crushed into particles of any desired size. These particles are highly porous and have properties similar to those which have been described previously. Other modifications of the invention which fall within the scope of the following claim will be immediately evident to those skilled in this art.

I claim:

The process of forming non-pyrophoric nickel powder which consists in exothermally decomposing finely divided catalytically active hydrided nickel powder at about atmospheric pressure, in an atmosphere selected from the group consisting of carbon-dioxide and hydrogen, by heating it therein to a temperature of about 400° F. to start the exothermal decomposition and holding its temperature within the range of about 400°–1200° F. during such decomposition and until cessation of evolution of hydrogen therefrom, and cooling the resulting non-sintered powder in the presence of said non-reactive atmosphere.

MURRAY RANEY.

REFERENCES CITED

The following references are of record in the file of this patent:

UNITED STATES PATENTS

| Number | Name | Date |
|---|---|---|
| 865,687 | Edison | Sept. 10, 1907 |
| 1,127,911 | Morey | Feb. 9, 1915 |
| 1,238,774 | Ittner | Sept. 4, 1917 |
| 1,628,190 | Raney | May 10, 1927 |
| 2,166,183 | Signaigo | July 18, 1939 |
| 2,326,275 | Zeltner | Aug. 10, 1943 |

OTHER REFERENCES

Mellor's, "Comprehensive Treatise on Inorganic and Theoretical Chemistry," 1936, vol. 15, pages 373–4.